United States Patent
McLeod

(10) Patent No.: US 7,640,378 B2
(45) Date of Patent: Dec. 29, 2009

(54) METHOD AND APPARATUS FOR IMPROVING THE PERFORMANCE OF USB MASS STORAGE DEVICES IN THE PRESENCE OF LONG TRANSMISSION DELAYS

(75) Inventor: John Alexander McLeod, Surrey (CA)

(73) Assignee: Icron Technologies Corporation, Burnaby, British Columbia (CA)

( * ) Notice: Subject to any disclaimer, the term of this patent is extended or adjusted under 35 U.S.C. 154(b) by 254 days.

(21) Appl. No.: 11/076,993

(22) Filed: Mar. 11, 2005

(65) Prior Publication Data

US 2006/0206636 A1 Sep. 14, 2006

(51) Int. Cl.
- G06F 3/00 (2006.01)
- G06F 13/00 (2006.01)
- G06F 13/14 (2006.01)
- G06F 13/42 (2006.01)
- G06F 15/16 (2006.01)
- G06F 11/00 (2006.01)

(52) U.S. Cl. ............ 710/29; 710/36; 710/105; 710/305; 710/313; 709/217; 709/230; 709/232; 709/237; 709/238; 714/1

(58) Field of Classification Search ............ 710/29
See application file for complete search history.

(56) References Cited

U.S. PATENT DOCUMENTS

| | | |
|---|---|---|
| 5,588,140 A | 12/1996 | Misukanis et al. |
| 5,781,747 A | 7/1998 | Smith et al. |
| 5,784,581 A | 7/1998 | Hannah |
| 5,797,028 A | 8/1998 | Gulick et al. |
| 5,799,041 A | 8/1998 | Szkopek et al. |
| 5,878,221 A | 3/1999 | Szkopek et al. |
| 5,890,015 A | 3/1999 | Garney et al. |
| 5,983,073 A | 11/1999 | Ditzik |
| 6,308,215 B1 * | 10/2001 | Kolbet et al. ......... 709/233 |
| 6,311,294 B1 * | 10/2001 | Larky et al. ......... 714/44 |

(Continued)

FOREIGN PATENT DOCUMENTS

GB 2325997 12/1998

(Continued)

OTHER PUBLICATIONS

Patent Abstracts of Japan; vol. 2000, No. 09, Oct. 13, 2000; & JP 2000-183920 A (Matsushita Electric Ind. Co. Ltd), Jun. 30, 2000.

(Continued)

*Primary Examiner*—Henry W. H. Tsai
*Assistant Examiner*—Michael Sun
(74) *Attorney, Agent, or Firm*—Gerald A. Gowan; Gowan Intellectual Property

(57) ABSTRACT

A method and apparatus for improving the performance of Universal Serial Bus mass storage devices is provided wherein a local extender located adjacent to a host computer is used in combination with a remote extender located adjacent to a peripheral device. The local extender and remote extender units jointly implement a protocol that enables bulk data to be transferred efficiently between the units even when the transmission delay between the units exceeds 1 microsecond. No alterations to the host computer or the USB mass storage device are required to achieve the improved performance. An improved method for connecting USB mass storage devices to a host controller is provided.

16 Claims, 7 Drawing Sheets

U.S. PATENT DOCUMENTS

| | | |
|---|---|---|
| 6,381,666 B1 | 4/2002 | Kejser et al. |
| 6,389,029 B1 | 5/2002 | McAlear |
| 6,697,372 B1 * | 2/2004 | McAlear ..................... 370/402 |
| 6,718,412 B2 * | 4/2004 | Purcell et al. ............... 710/109 |
| 6,721,332 B1 | 4/2004 | McAlear |
| 6,965,614 B1 | 11/2005 | Osterhout et al. |
| 6,993,620 B2 * | 1/2006 | Ferguson .................... 710/313 |
| 7,028,133 B1 * | 4/2006 | Jackson ...................... 710/313 |
| 7,080,189 B1 * | 7/2006 | Luttmann .................. 710/313 |
| 7,159,065 B1 * | 1/2007 | Marlatt ....................... 710/313 |
| 2002/0144042 A1 * | 10/2002 | Garney ....................... 710/300 |
| 2002/0167851 A1 * | 11/2002 | Ishida et al. ................ 365/200 |

FOREIGN PATENT DOCUMENTS

| | | |
|---|---|---|
| WO | WO 00 49507 A | 8/2000 |
| WO | WO 00 67103 A | 11/2000 |
| WO | WO 02 088975 | 11/2002 |

OTHER PUBLICATIONS

Universal Serial Bus Specification, Rev. 2.0, Apr. 27, 2000, Compaq Computer Corp. et al., Section 8.4.5. Selected pages.

Universal Serial Bus Mass Storage Class, Bulk-only Transport, Rev. 1.0, Sep. 31, 1999.

* cited by examiner

| Byte | Contents |
|---|---|
| 0-3 | CBW_Signature |
| 4-7 | CBW_Tag |
| 8-11 | CBW_Data_Transfer_Length |
| 12 | CBW_Flags |
| 13-30 | Miscellaneous |

| Byte | Contents |
|---|---|
| 0-3 | CSW_Signature |
| 4-7 | CSW_Tag |
| 8-11 | CSW_Data_Residue |
| 12 | CSW_Status |

METHOD AND APPARATUS FOR IMPROVING THE PERFORMANCE OF USB MASS STORAGE DEVICES IN THE PRESENCE OF LONG TRANSMISSION DELAYS

FIELD OF THE INVENTION

This invention relates to methods and apparatus for transmitting signals between computers and devices using Universal Serial Bus (USB) ports, and, in particular, to a method for operating USB mass storage devices using such ports when the transmission path between said computers and mass storage devices exhibits significant time delay.

DESCRIPTION OF THE PRIOR ART

Universal Serial Bus (USB) is a technology designed to permit a wide range of peripherals to be attached to personal computers by the average user. The technology supports all of the common peripheral devices such as keyboards, mice, speakers, joysticks, cameras, flash drives, hard drives, DVD drives and many others, and its use in current computers is common.

USB was created by an alliance of seven of the largest companies in the computer and communication markets. Those companies were Intel, Compaq, Microsoft, NorTel, NEC, Digital and IBM. The specifications defining USB (e.g. Intel et al., Universal Serial Bus Specification, Revision 1.0, January 1996; and updated as Revision 1.1 in Sep. 23, 1998, and further updated as Revision 2.0 in April 2000, and subsequent updates, additions and modifications—hereinafter collectively referred to as the "USB Specification", which term can include future modifications and revisions) are non-proprietary and are managed by an open industry organization known as the USB Forum. The USB Specification establishes a number of criteria which must be met in order to comply to USB standards. The USB Specification also defines a number of terms, which definitions are adopted for the purposes of this specification.

Of most relevance to the present invention, however, is the feature that all known USB Specifications currently limit the distance that a device can be separated from its host PC to a maximum of 5 meters. By using a series of USB Hubs—devices that are intended to support increased populations rather than increased distances—this distance limitation can be increased, in theory, to 30 meters. However, this multiple hub solution is both expensive and clumsy.

In U.S. Pat. No. 6,381,666, the contents of which are incorporated herein by reference, a method and apparatus for extending the distance between a host PC and a peripheral device, is provided which increased the useable distance to 100 meters or more. While this approach has been beneficial, it would still be desirable to provide alternative and/or improved methods and apparatus for achieving this same effect.

The major factor that limits the extent to which the range of USB can be extended is transmission delay. The USB Specification allows a maximum period of approximately 1.5 microseconds for the round-trip delay of a single communication from a host computer to a device and back to the computer. The round-trip delay budget of 1.5 microseconds is composed of two approximately equal parts, namely, the transmission delay in both directions between the host computer and the device and secondly, the turn-around time required by the device to create the desired response. The approach described in U.S. Pat. No. 6,381,666 removed this restriction on the upper limit of round-trip delay.

While the approach described in U.S. Pat. No. 6,381,666 made it possible to operate USB mass storage devices over an extended distance, because of the protocols for bulk data transfer, the time delays encountered could be unduly long. In order to avoid or ameliorate these unduly long transmission delays, it would be desirable to further improve the performance of USB mass storage devices when round-trip delays exceed the original specified value.

SUMMARY OF THE INVENTION

Accordingly, while the range extending USB technology, as described in U.S. Pat. No. 6,381,666 has proven to be useful, it would still be desirable to provide improvements to the technology by providing an improved method and apparatus for enabling mass storage devices, utilizing the USB specification, to be used in the presence of long transmission delays.

Therefore, it is an objective of this invention to provide improved methods and apparatus to enable mass storage devices that otherwise conform to the USB specification to communicate in the presence of transmission delays greater than that currently permitted under said USB Specification.

It is a further object of the invention to minimise the effects of transmission delay on the performance, as measured by effective data transfer rate, of said USB mass storage devices.

It is a further object of the present invention that no hardware or software changes need be made to the existing host computers, hubs and devices supported by the system and operating under the USB protocol. The invention, thereby, may be incorporated into networks composed of both conventional delay and extended delay devices.

It is a further object of the present invention that the apparatus be very cost effective, consistent with the broadest population of devices targeted by the USB industry.

It is a further object of the present invention that support be provided for high-speed (HS) and full-speed (FS) USB mass storage devices.

It is a further object of the present invention that the system detect automatically the presence of said USB mass storage devices and select the methods for handling said devices without manual intervention or configuration.

These and other objects of the invention, which will become apparent herein, are attained by the present invention which invention provides a method and related apparatuses, wherein a host computer is connected to a local extender device which, in turn, is connected to a remote extender device connected to a conventional USB peripheral device, wherein signals between the host computer and the USB peripheral device are processed in the local extender and/or the remote extender so as to allow the host computer and the USB peripheral device to operate in the presence of transmission delays greater than that normally allowed in the USB specification. In particular, the invention is of most utility when the round-trip transmission delay between the host computer and the USB peripheral device exceeds 1 microsecond.

Accordingly, in a first aspect, the present invention provides a method for transmitting an inbound data stream, preferably over a transmission system in which the round-trip delay exceeds 1 microsecond, from a peripheral device to a host computer, wherein said host computer and said peripheral device conform to the requirements of the USB Specification, and wherein said peripheral device is preferably a mass storage device, through a local extender and a remote extender, which method comprises:
- a) forwarding an inbound data transfer command from said host computer to said USB peripheral device by sending said command to said local extender, having said local extender forward said command to said remote extender, and then having said remote extender forward said command to said USB peripheral device;
- b) forwarding an acknowledgement of said command from said USB peripheral device to said host computer by sending said acknowledgement to said remote extender, having said remote extender forward said acknowledgement to said local extender, and then having said local extender forward said acknowledgement to said host computer as a forwarded acknowledgement signal;
- c) having said local extender generate negative acknowledgement responses to said host computer until said forwarded acknowledgement signal has been received by said local extender;
- d) having said local extender absorb repetitions of said command generated by said host computer until said forwarded acknowledgement signal has been received by said local extender;
- e) forwarding a request for inbound data packets from said host computer to said USB peripheral device by sending said request to said local extender, having said local extender forward said request to said remote extender, and then having said remote extender forward said request to said USB peripheral device;
- f) forwarding inbound data packets from said USB peripheral device to said host computer by sending said inbound data packets to said remote extender, having said remote extender forward said inbound data packets to said local extender, and then having said local extender forward said inbound data packets to said host computer;
- g) having said remote extender generate acknowledgement responses to said USB peripheral device after each inbound data packet is received by said remote extender;
- h) having said local extender generate negative acknowledgement responses to said host computer until said inbound data packet has been received by said local extender;
- i) having said local extender absorb repetitions of said request for inbound data packets;
- j) having said local extender absorb acknowledgement packets received from said host computer;
- k) having said remote extender generate additional requests for inbound data packets to said USB peripheral device until the requirements of said inbound data transfer command have been met;
- l) forwarding a request for inbound data transfer status from said host computer to said USB peripheral device by sending said request to said local extender, having said local extender forward said request to said remote extender, and then having said remote extender forward said request to said USB peripheral device;
- m) forwarding said inbound data transfer status from said USB peripheral device to said host computer by sending said status to said remote extender, having said remote extender forward said status to said local extender, and then having said local extender forward said status to said host computer;
- n) having said remote extender generate an acknowledgement response to said USB peripheral device;
- o) having said local extender generate negative acknowledgement responses to said host computer until said status has been received by said local extender; and
- p) having said local extender absorb repetitions of said request for inbound data transfer status until said status has been received by said local extender.

In a further aspect, the present invention provides a method for transmitting an outbound data stream, preferably over a transmission system in which the round-trip delay exceeds 1 microsecond, from a host computer to a peripheral device, wherein said host computer and said peripheral device conform to the requirements of the USB Specification, and wherein said peripheral device is preferably a mass storage device, through a local extender and a remote extender, which method comprises:
- a) forwarding an outbound data transfer command from said host computer to said USB peripheral device by sending said command to said local extender, having said local extender forward said command to said remote extender, and then having said remote extender forward said command to said USB peripheral device;
- b) forwarding an acknowledgement of said command from said USB peripheral device to said host computer by sending said acknowledgement to said remote extender, having said remote extender forward said acknowledgement to said local extender, and then having said local extender forward said acknowledgement to said host computer as a forwarded acknowledgement signal;
- c) having said local extender generate negative acknowledgement responses to said host computer until said forwarded acknowledgement signal has been received by said local extender;
- d) having said local extender absorb repetitions of said command until said forwarded acknowledgement signal has been received by said local extender;
- e) forwarding outbound data packets from said host computer to said USB peripheral device by sending said outbound data packets to said local extender, having said local extender forward said outbound data packets to said remote extender, and then having said remote extender forward said outbound data packets to said USB peripheral device;
- f) having said local extender generate acknowledgement responses to said host computer after each outbound data packet is received by said local extender;
- g) having said remote extender absorb each acknowledgement response generated by said USB peripheral device;
- h) forwarding a request for outbound data command status from said host computer to said USB peripheral device by sending said request to said local extender, having said local extender forward said request to said remote extender, and then having said remote extender forward said request to said USB peripheral device;
- i) forwarding said outbound data command status from said USB peripheral device to said host computer by sending said status to said remote extender, having said remote extender forward said status to said local extender, and then having said local extender forward said status to said host computer;
- j) having said remote extender generate an acknowledgement response to said USB peripheral device;
- k) having said local extender generate negative acknowledgement responses to said host computer until said status has been received by said local extender; and
- l) having said local extender absorb repetitions of said request for outbound data command status until said status has been received by said local extender.

In a further aspect the present invention also provides an apparatus for transmitting data between a host computer and a USB peripheral device, and preferably a mass storage device, in a data transfer session wherein said session comprises: i) a command phase; ii) a data phase; and iii) a status phase, in the presence of transmission delays greater than that normally allowed in the USB specification; said apparatus comprising:

a) a host computer for initiating said data-transfer session;

b) a local extender unit for forwarding command and outbound data packets from said host computer to said remote extender, and for forwarding inbound data, status and acknowledgement packets from said remote extender to said host computer;

c) a data transmission system exhibiting transmission delays greater than that normally allowed in the USB specification between said host computer and said USB peripheral device;

d) a remote extender unit for forwarding command and outbound data packets from said local extender to said USB peripheral device, and for forwarding inbound data, status and acknowledgement packets from said USB peripheral device to said local extender;

e) a USB peripheral device capable of responding to data transfer commands;

f) means in said local extender unit for generating a data-transfer acknowledgement packet and sending said packet to said host computer;

g) means in said local extender unit for storing an inbound data packet or inbound acknowledgement packet until such packet is requested by said host computer;

h) means in said local extender unit for absorbing replicated command, outbound data and status request packets;

i) means in said local extender unit for recognising when a data transfer session is initiated and when said session is complete;

j) means in said remote extender unit for generating a data-transfer acknowledgement packet and sending said packet to said USB peripheral device;

k) means in said remote extender unit for generating a request for inbound data-transfer and sending said request to said USB peripheral device;

l) means in said remote extender unit for absorbing data-transfer acknowledgement packets; and m) means in said remote extender unit for recognising when a data transfer session is initiated and when said session is complete.

In a further aspect the present invention also provides a method for determining the boundaries and properties of a data transfer session between a host computer and a USB peripheral device, and in particular determining whether a data transfer session conforms to the Bulk-only Transport Protocol as defined by the USB Specification, which method comprises:

a) forwarding all outbound packets from a USB host controller to a USB peripheral device through an extender unit;

b) detecting the start of a data transfer session by comparing the structure of each outbound data packet with that of a Command Block Wrapper (CBW) as defined by the USB Specification;

c) verifying the detection of a CBW by comparing the first four bytes of said outbound data packet with the unique signature of a CBW;

d) extracting a unique tag from said outbound data packet by reading data from the CBW Tag field as defined by the CBW structure;

e) determining the amount of data to be transmitted during said data transfer session by reading data from the CBW Data Transfer Length field as defined by the CBW structure; and f) determining the direction of said data transfer session by reading data from the CBW Flags field as defined by the CBW structure.

In a further aspect the present invention also provides an apparatus for intercepting, analysing and generating USB packets, preferably for use in the practise of the method of the present invention; said apparatus comprising:

a) an upstream transceiver for receiving data packets travelling in the outbound direction and for transmitting data packets travelling in the inbound direction;

b) a downstream transceiver for receiving packets travelling in the inbound direction and for transmitting data packets travelling in the outbound direction;

c) a packet processor for forwarding USB packets between the upstream transceiver and the downstream transceiver, and for analysing the information contained in said USB packets;

d) means in said packet processor for absorbing USB packets received from said upstream and downstream transceivers;

e) means in said packet processor for storing USB packets received from said upstream and downstream transceivers;

f) means in said packet processor for analysing the information contained in the USB packets received from said upstream and downstream transceivers; and g) means in said packet processor for generating USB packets and forwarding said USB packets to said upstream and downstream transceivers.

DESCRIPTION OF THE PREFERRED EMBODIMENTS

In a preferred embodiment, the host computer can be any standard unit that supports the USB Specification. Preferably, no modifications to either the hardware or the software of said computer are required.

The local extender is preferably a self-contained unit that connects to the host computer through a standard USB cable.

The remote extender is preferably a self-contained unit that connects to the USB peripheral device through a standard USB cable.

The data transmission system is not limited to any particular media or protocol, but will, in operation in accordance with the present invention, typically introduce a round-trip transmission delay between the host computer and the USB peripheral device in excess of 1 microsecond.

The methods and apparatuses of the present invention are most preferably used in a system wherein said host controller is a PC, and said peripheral device is a mass storage unit such as, for example, a flash drive, a hard drive, a CD/DVD drive or any other USB device capable of operating as a mass storage unit. This includes any device which transfers or receives data from the host controller using the USB bulk data transfer protocol.

In a preferred embodiment of an extender unit, the packet processor is implemented in a Field Programmable Gate Array (FPGA).

In a preferred embodiment of a local extender unit, the upstream transceiver is a standard USB transceiver and the downstream transceiver is a wireless transceiver.

In a preferred embodiment of a remote extender unit, the upstream transceiver is a wireless transceiver and the downstream transceiver is a standard USB transceiver.

BRIEF DESCRIPTION OF THE DRAWINGS

The invention, and various aspects thereof will be described by reference to the attached drawings wherein.

DETAILED DESCRIPTION OF THE INVENTION

Figure 1:
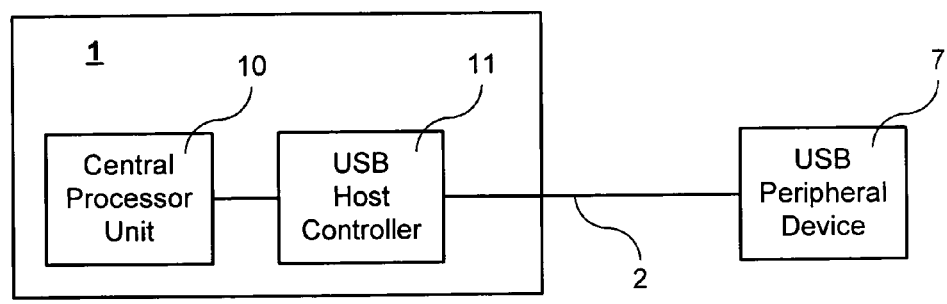
FIG. 1 is a block diagram of a system according to USB.

FIG. 1 is a block diagram of a prior art system designed according to the USB Specification. According to the USB specifications, a USB-enabled computer (1) may be assembled by equipping a central processor unit (10) with an input/output unit known as a USB host controller (11). The USB host controller (11) performs input/output operations according to the USB protocol and communicates with an external USB peripheral device (7) over a USB cable (2). The USB cable is not permitted to exceed 5 meters in length.

Figure 2:
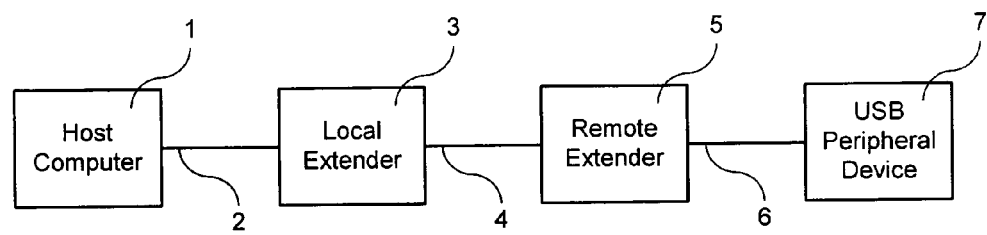
FIG. 2 is a block diagram of a system for communicating with USB devices in the presence of long transmission delays.

FIG. 2 is a block diagram of a system for communication between USB devices in the presence of long transmission delays, according to the present invention. In this arrangement, input/output operations for host computer (1) are intercepted by a local extender (3) which is connected to said host computer through a standard USB cable (2). The local extender (3) preferably generates a "modified" form of the USB protocol that is delivered over transmission system (4) to a remote extender (5) which can be located at an extended distance from the local extender (3).

As such, in this embodiment of the present invention, a host computer (1), and a local extender (3) are assembled as individual units. It will be apparent to those skilled in the art that different combinations of these components might be used and that alternative packaging arrangements are possible.

The remote extender (5) receives signals from the physical media and then, if necessary, preferably converts the received signals to electrical signals compatible with the USB protocol and delivers these electrical signals over USB cable (6) to USB peripheral device (7). The USB peripheral device is a flash storage device but might be any USB mass storage device, as described hereinabove.

The reverse process occurs when signals are passed from USB peripheral device (7) to host computer (1).

As such, in this embodiment of the present invention, a remote extender (5) and a USB peripheral device (7) are assembled as individual units. It will be apparent to those skilled in the art that different combinations of these components might be used and that alternative packaging arrangements are possible.

In one embodiment of the present invention, the external transmission system (4) is a point-to-point connection using single-mode fiber-optic cable and the round-trip delay between host computer (1) and USB peripheral device (7) can be up to, for example, 1 millisecond or more. In other embodiments, however, the external media can be changed. For example, in another embodiment of the invention, the external transmission system (4) can be a wireless connection and the round-trip delay between host computer (1) and USB peripheral device (7) can be up to, for example, 100 milliseconds or more. In a further embodiment of the invention, the external transmission system (4) can be an internet connection and the round-trip delay between host computer (1) and USB peripheral device (7) can be up to, for example, 1 second or more.

As such, it will be apparent to those skilled in the art that different transmission systems might be used, and that the corresponding round-trip delays may change accordingly.

Figure 3:
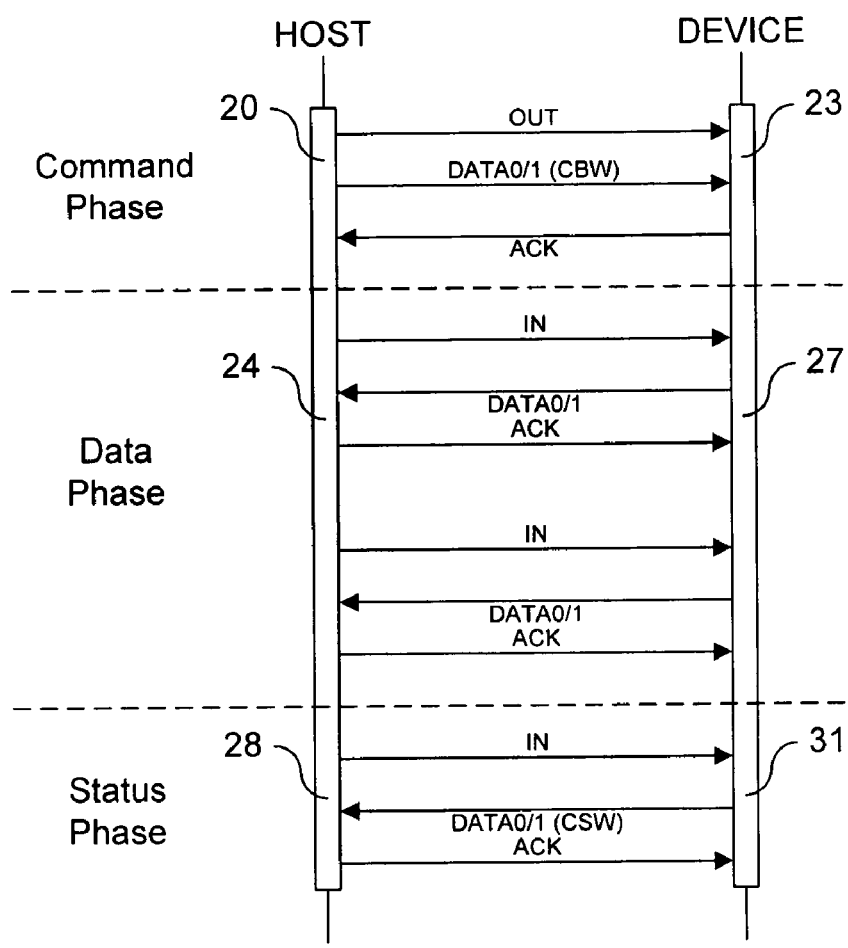
FIG. 3 is a sequence diagram showing an inbound data transfer session according to the prior art USB protocol using an arrangement as shown in FIG. 1.

FIG. 3 is a sequence diagram showing an inbound data transfer session according to the USB protocol. The presentation format used in the diagram is attributable to Jacobson et al. (Ivar Jacobson, Magnus Christerson, Patrick Jonsson and Gunnar Overgaard, Object-Oriented software Engineering: A Use Case Driven Approach, Addison-Wesley, 1992.) In accordance with the protocol, the inbound data transfer session is composed of three individual phases; namely a command phase, a data phase and a status phase.

During the command phase, the control logic (20) within host computer (1) generates a notification of inbound data transfer and transmits said notification to USB peripheral device (7) as an OUT packet followed by a DATA0/1 (CBW) packet. The control logic (23) within said USB peripheral device receives said notification and signals acceptance of the command by returning a positive acknowledgement as an ACK packet to said host computer.

In the data phase of the same session, the control logic (24) within host computer (1) generates a request for inbound data and transmits said request to USB peripheral device (7) as an IN packet. The control logic (27) within said USB peripheral device assembles said requested inbound data and transmits said data to said host computer as a DATA0/1 packet. The host computer verifies the correctness of the received data and responds with a positive acknowledgement as an ACK packet to said USB peripheral device.

The control logic (24) within said host computer generates repeated requests for inbound data until the required block of data has been transferred. Once the data phase is complete, the system moves to the status phase.

In the status phase of the same session, the control logic (28) within host computer (1) generates a request for inbound data transfer status and transmits said request to USB peripheral device (7) as an IN packet. The control logic (31) within said USB peripheral device assembles said requested inbound data transfer status and transmits said status to said host computer as a DATA0/1 (CSW) packet. The host computer verifies the correctness of the received data and responds with a positive acknowledgement as an ACK packet to said USB peripheral device.

Figure 4:
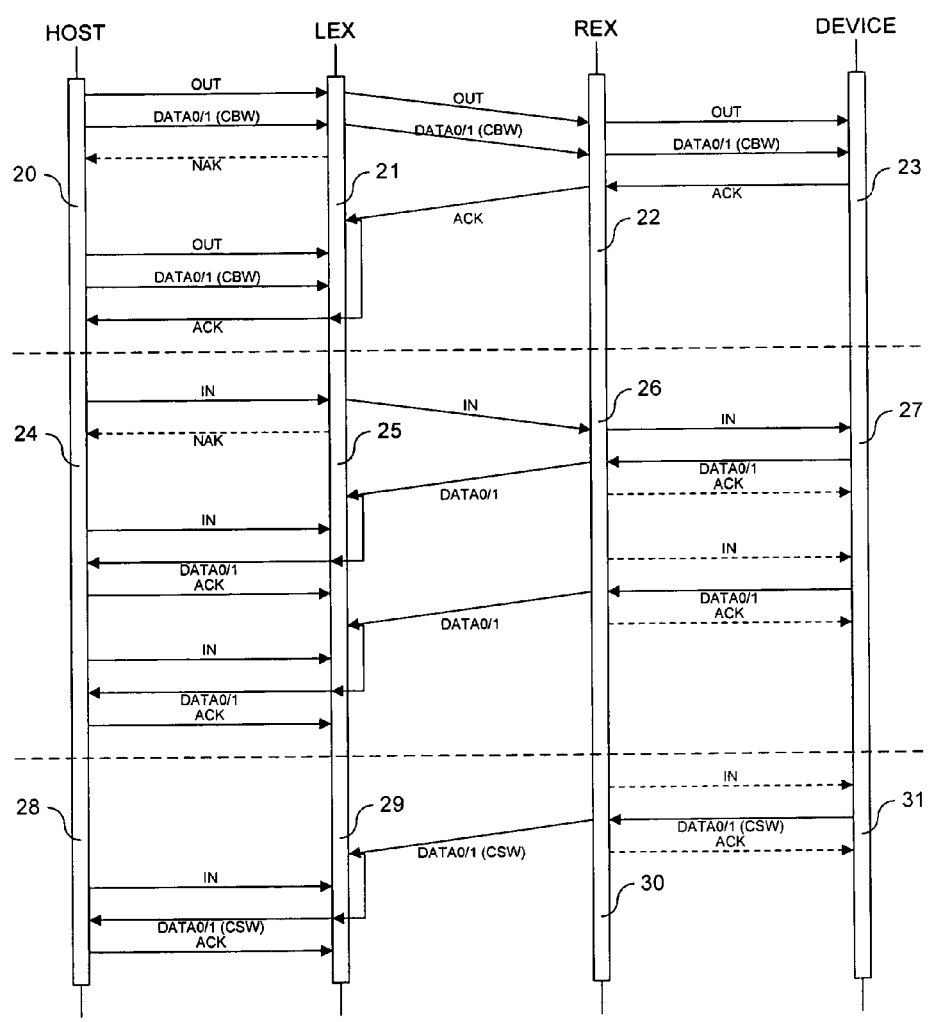
FIG. 4 is a sequence diagram showing an inbound data transfer session according to the invention.

FIG. 4 is a sequence diagram showing an inbound data transfer session according to the present invention. The inbound data transfer session is composed of three individual phases; namely a command phase, a data phase and a status phase.

During the command phase, the control logic (20) within host computer (1) generates an original notification of inbound data transfer and transmits said notification to local extender (3) as an OUT packet followed by a DATA0/1 (CBW) packet. The control logic (21) within local extender (3) receives said notification and forwards said notification to remote extender (5). Control logic (21) also responds to said host computer with a negative acknowledgement as a NAK packet. The control logic (22) within remote extender (5) receives said notification and forwards said notification to USB peripheral device (7). The control logic (23) within USB peripheral device (7) receives said notification and signals acceptance of said inbound data transfer command by returning a positive acknowledgement as an ACK packet to said remote extender. Control logic (22) forwards said ACK packet to said local extender where it is stored in memory by control logic (21).

After a delay, control logic (20) in the host computer retries said original notification of inbound data transfer. Upon reception of said retried notification of inbound data transfer, control logic (21) in the local extender retrieves said stored ACK packet from memory, and returns said ACK packet to said host computer. This completes the command phase.

In the data phase of the same session, the control logic (24) within host computer (1) generates an original request for inbound data and transmits said request to local extender (3) as an IN packet. The control logic (25) within local extender (3) receives said request for inbound data and forwards said request to remote extender (5). Control logic (25) also responds to said host computer with a negative acknowledgement as a NAK packet. The control logic (26) within remote extender (5) receives said request for inbound data and forwards said request to USB peripheral device (7).

The control logic (27) within USB peripheral device (7) assembles said requested inbound data and transmits said data to remote extender (5) as a DATA0/1 packet. The control logic (26) within said remote extender verifies the correctness of the received data and responds with a positive acknowledgement as an ACK packet to said USB peripheral device. Control logic (26) forwards said DATA0/1 packet to said local extender where it is stored in memory by control logic (25).

After a delay, control logic (24) in host computer (1) retries said original request for inbound data transfer. Upon reception of said retried request for inbound data transfer, control logic (25) in local extender (3) retrieves said stored DATA0/1 packet from memory, and forwards said DATA0/1 packet to said host computer. The host computer verifies the correctness of the received data and responds with a positive acknowledgement as an ACK packet to said local extender.

Upon reception of the first DATA0/1 packet by control logic (26) in remote extender (5), said control logic determines whether additional inbound data packets are required to fulfill said original notification of inbound data transfer. If it is determined that additional data is required, then control logic (26) generates a local request for additional inbound data and forwards said request to USB peripheral device (7) as an IN packet.

The control logic (27) within the USB peripheral device (7) assembles said additional inbound data and transmits said data to remote extender (5) as a DATA0/1 packet. The control logic (26) within said remote extender verifies the correctness of the received data and responds with a positive acknowledgement as an ACK packet to said USB peripheral device. Control logic (26) forwards said additional DATA0/1 packet to local extender (3) where it is stored in memory by control logic (25).

After a delay, control logic (24) in host computer (1) retries said original request for inbound data transfer. Upon reception of said retried request for inbound data transfer, control logic (25) in local extender (3) retrieves said stored additional DATA0/1 packet from memory, and forwards said stored additional DATA0/1 packet to said host computer. The host computer verifies the correctness of the received data and responds with a positive acknowledgement as an ACK packet to said local extender. This process repeats until the requirements of said original notification of inbound data transfer are fulfilled and the data phase is complete. Once the data phase is complete, the system moves to the status phase.

In the status phase of the same session, control logic (28) within host computer (1) generates a request for inbound data transfer status and transmits said request to the local extender (3) as an IN packet. Control logic (29) in said local extender forwards said request to remote extender (5) and responds to said host computer with a negative acknowledgement as a NAK packet.

The control logic (30) within remote extender (5) forwards said request for inbound data transfer status to USB peripheral device (7). The control logic (31) within said USB peripheral device assembles said requested inbound data transfer status and transmits said status to said remote extender as a DATA0/1 (CSW) packet. The remote extender verifies the correctness of the received data and responds with a positive acknowledgement as an ACK packet to said USB peripheral device. Control logic (30) forwards said status as a DATA0/1 (CSW) packet to local extender (3) where it is stored in memory by control logic (29).

After a delay, control logic (28) in host computer (1) generates a second request for inbound data transfer status. Upon reception of said second request for inbound data transfer status, control logic (29) in local extender (3) retrieves said stored DATA0/1 (CSW) packet from memory, and returns said stored DATA0/1 (CSW) packet to said host computer. The host computer verifies the correctness of the received data and responds with a positive acknowledgement as an ACK packet to said local extender. The local extender absorbs said positive acknowledgement packet.

Figure 5:
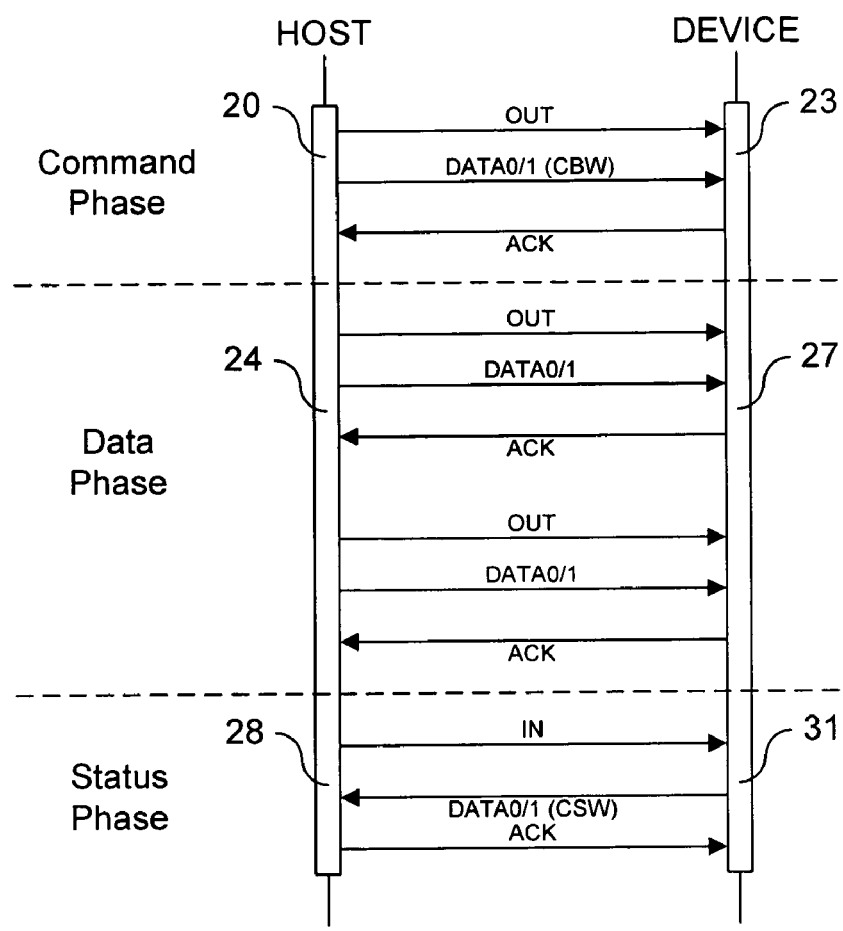
FIG. 5 is a sequence diagram showing an outbound data transfer session according to the prior art USB protocol.

FIG. 5 is a sequence diagram showing an outbound data transfer session according to the USB protocol. Said outbound data transfer session is composed of three individual phases; a command phase, a data phase and a status phase.

During the command phase, the control logic (20) within host computer (1) generates a notification of outbound data transfer and transmits said notification to USB peripheral device (7) as an OUT packet followed by a DATA0/1 (CBW) packet. The control logic (23) within said USB peripheral device receives said notification and signals acceptance of the command by returning a positive acknowledgement as an ACK packet to said host computer.

In the data phase of the same session, control logic (24) within host computer (I) generates an outbound data transaction and transmits said transaction to USB peripheral device (7) as an OUT/DATA0/1 packet. The control logic (27) within said USB peripheral device accepts said outbound data transaction, verifies the correctness of the received data and responds with a positive acknowledgement as an ACK packet to said host computer.

The control logic (24) within host computer (1) generates repeated outbound data transactions until the required block of data has been transferred. Once the data phase is complete, the system moves to the status phase.

In the status phase of the same session, the control logic (28) within host computer (1) generates a request for outbound data transfer status and transmits said request to USB peripheral device (7) as an IN packet. The control logic (31) within said USB peripheral device assembles said requested outbound data transfer status and transmits said status to said host computer as a DATA0/1 (CSW) packet. The host computer verifies the correctness of the received data and responds with a positive acknowledgement as an ACK packet to said USB peripheral device.

Figure 6:
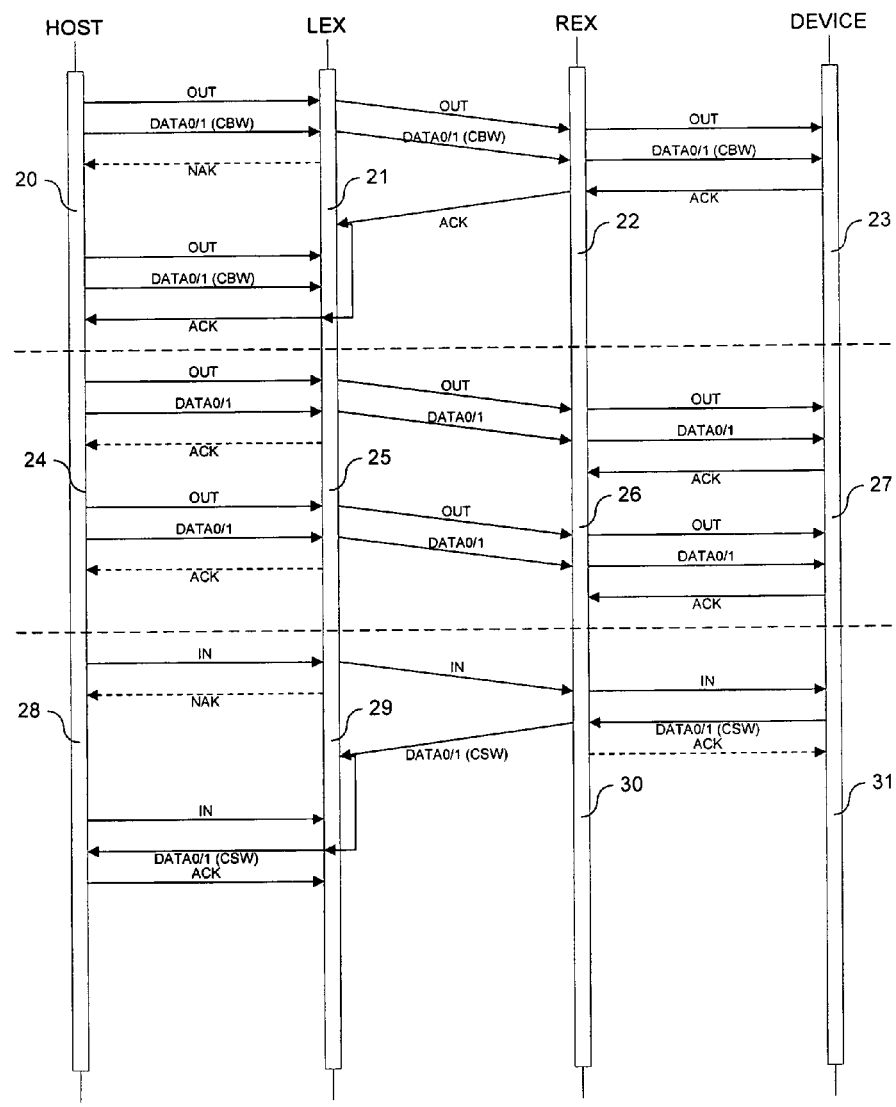
FIG. 6 is a sequence diagram showing an outbound data transfer session according to the invention.

FIG. 6 is a sequence diagram showing an outbound data transfer session according to the present invention. Said outbound data transfer session is composed of three individual phases; a command phase, a data phase and a status phase.

During the command phase, the control logic (20) within host computer (1) generates an original notification of outbound data transfer and transmits said notification to local extender (3) as an OUT packet followed by a DATA0/1 (CBW) packet. The control logic (21) within local extender (3) receives said notification and forwards said notification to remote extender (5). Control logic (21) also responds to said host computer with a negative acknowledgement as a NAK packet. The control logic (22) within remote extender (5) receives said notification and forwards said notification to USB peripheral device (7). The control logic (23) within said USB peripheral device receives said notification and signals acceptance of said inbound data transfer command by returning a positive acknowledgement as an ACK packet to said remote extender. Control logic (22) forwards said ACK packet to said local extender where it is stored in memory by control logic (21).

After a delay, control logic (20) in host computer (1) retries said original notification of outbound data transfer. Upon reception of said retried notification of outbound data transfer, control logic (21) in local extender (3) retrieves said stored ACK packet from memory, and returns said ACK packet to said host computer. This completes the command phase.

In the data phase of the same session, control logic (24) within host computer (1) generates a first outbound data transaction and transmits said transaction to local extender (3) as an OUT/DATA0/1 packet. The control logic (25) within local extender (3) receives said first outbound data transaction and forwards said transaction to remote extender (5). Control logic (25) also responds to said host computer with a positive acknowledgement as an ACK packet. The control logic (26) within remote extender (5) receives said first outbound data transaction and forwards said transaction to USB peripheral device (7).

The control logic (27) within USB peripheral device (7) verifies the correctness of the received data and responds with a positive acknowledgement as a first ACK packet. The control logic (26) within remote extender (5) absorbs said first ACK packet.

Upon reception of said first ACK packet by control logic (24) in host computer (1), said control logic determines whether additional outbound data transactions are required to fulfill said original notification of outbound data transfer. If it is determined that additional data transactions are required, then control logic (24) generates said additional outbound data transactions and the process is repeated until the requirements are met.

Once the data phase is complete, the system moves to the status phase.

In the status phase of the same session, control logic (28) in host computer (1) generates a request for outbound data transfer status and forwards said request to local extender (3). Control logic (29) in said local extender forwards said request to remote extender (5) and responds to said host computer with a negative acknowledgement as a NAK packet.

The control logic (30) within remote extender (5) forwards said request for outbound data transfer status to USB peripheral device (7). The control logic (31) within said USB peripheral device assembles said requested outbound data transfer status and transmits said status to said remote extender as a DATA0/1 (CSW) packet. The remote extender verifies the correctness of the received data and responds with a positive acknowledgement as an ACK packet to said USB peripheral device. Control logic (30) forwards said status as a DATA0/1 (CSW) packet to local extender (3) where it is stored in memory by control logic (29).

After a delay, control logic (28) in host computer (1) generates a second request for outbound data transfer status. Upon reception of said second request for outbound data transfer status, control logic (29) in local extender (3) retrieves said stored DATA0/1 packet from memory, and returns said stored DATA0/1 packet to said host computer. The host computer verifies the correctness of the received data and responds with a positive acknowledgement as an ACK packet to said local extender. The local extender absorbs said positive acknowledgement packet.

Figures 7, 8, 9:
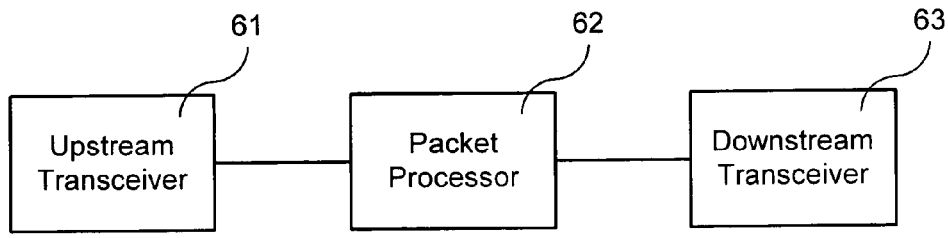
FIG. 7 is a table showing the structure of a USB command block wrapper according to the prior art USB protocol.
FIG. 8 is a table showing the structure of a USB command status wrapper according to the prior art USB protocol.
FIG. 9 is a block diagram of an extender unit according to the invention.

FIG. 7 is a table showing the structure of a USB command block wrapper according to the prior art USB specification. The first column identifies the relative position of data bytes following the token field of a USB data packet. The second column identifies the logical contents of the corresponding data bytes. Thus it can be seen that the CBW_Signature parameter occupies the first four bytes (locations 0, 1, 2 and 3) following the token field of a USB data packet.

According to the prior art USB specification, for a device that belongs to the mass storage class and that implements the bulk-only transport protocol, the value of CBW_Signature must be 43425355 in hexadecimal notation. This provides a unique value that can be detected by the extender unit provided in the present invention, and can be used for determining mass storage devices operating in accordance the USB bulk data transfer protocol. Detection of said unique value indicates to said extender unit that a data transfer session is about to commence.

According to the prior art USB specification, the value of CDW_Tag is allocated by said USB host controller to identify uniquely each individual data transfer session. Detection of said unique value enables said extender unit to differentiate between multiple data transfer sessions occurring simultaneously.

According to the prior art USB specification, the value of CDW_Data_Transfer_Length specifies the number of bytes to be transferred during the current session. Detection of said data transfer length enables said extender unit to determine how many data packets are required for the current session and to detect when said session is complete.

According to the prior art USB specification, bit 7 of the CDW_Flags field indicates the direction of data transfer. Detection of said direction enables said extender unit to select the appropriate algorithm for an inbound or outbound data transfer session.

FIG. 8 is a table showing the structure of a USB command status wrapper according to the prior art USB specification. The first column identifies the relative position of data bytes following the token field of a USB data packet. The second column identifies the logical contents of the corresponding data bytes.

Again, according to the prior art USB specification, for a device that belongs to the mass storage class and that implements the bulk-only transport protocol, the value of CBW_Signature must be 43425355 in hexadecimal notation. This provides a unique value that can be detected by the extender unit provided in the present invention. Detection of said unique value indicates to said extender unit that a data transfer session is complete.

According to the prior art USB specification, the value of CDW_Tag is allocated by said USB host controller to identify uniquely each individual data transfer session. Detection of said unique value enables said extender unit to differentiate between multiple data transfer sessions occurring simultaneously.

FIG. 9 is a block diagram representation of an extender unit (either local or remote) according to the invention. In this arrangement, USB traffic passing between upstream transceiver (61) and downstream transceiver (63) is routed through packet processor (62). By this means, packet processor (62) is able to forward packets or block packets as required. Said packet processor may also generate packets and forward said generated packets in either an upstream or downstream direction. Said packet processor may also examine the contents of packets in transit through the system and extract data to control the operation of subsequent data flows.

As such, in this embodiment of the present invention, an upstream transceiver (61), a packet processor (62) and a downstream transceiver (63) are assembled as separate units. It will be apparent, however, to those skilled in the art that different combinations of these components might be used and that alternative packaging arrangements are possible.

Figure 10:
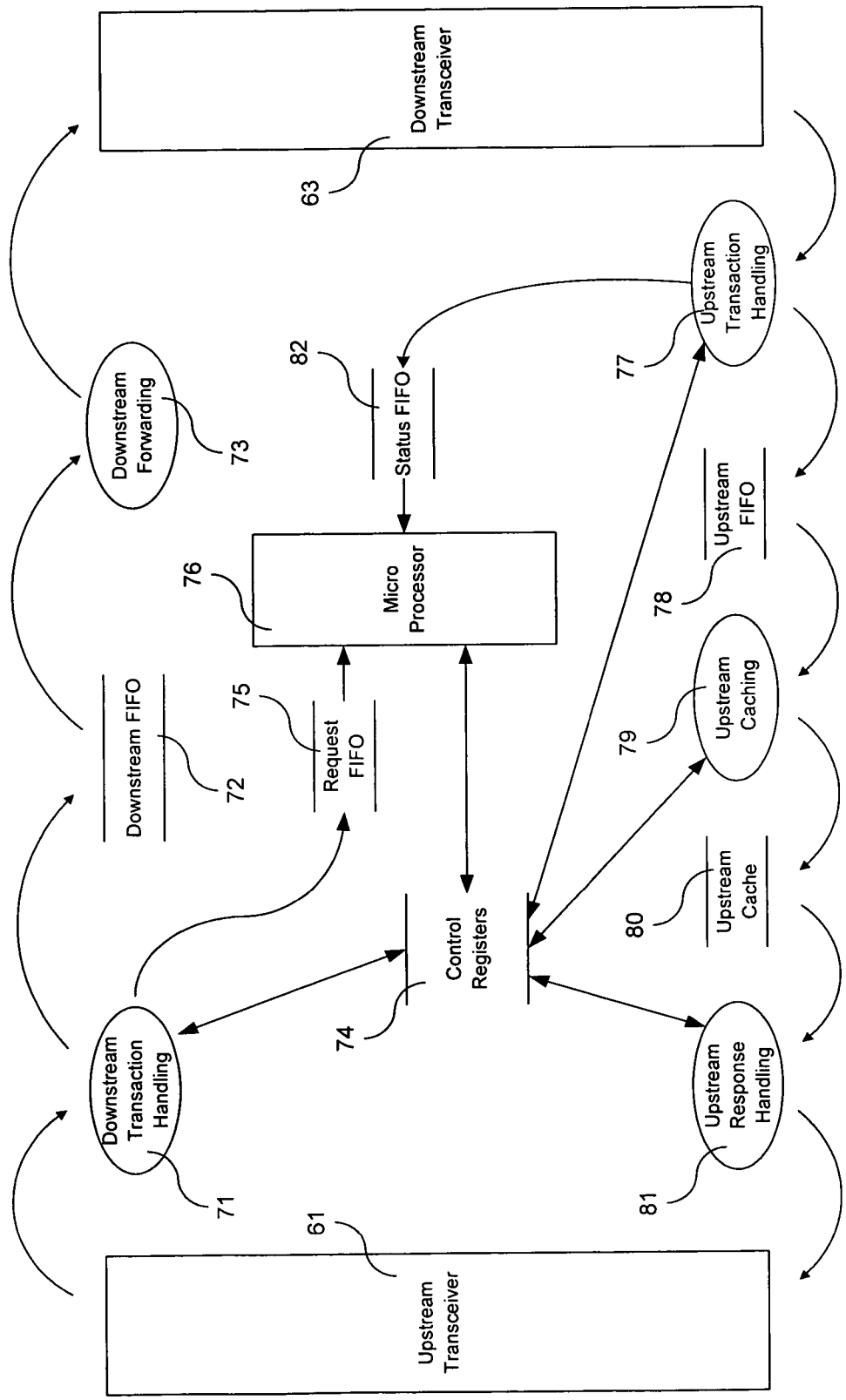
FIG. 10 is a data flow diagram showing the operation of an extender unit according to the invention.

In one particular embodiment of the present invention, the upstream transceiver (61) is a USB transceiver, the packet processor (62) is an FPGA and the downstream transceiver (63) is a wireless transceiver. This arrangement may be used to build a local extender for use in a wireless network In a further embodiment of the present invention, the upstream transceiver (61) is a wireless transceiver, the packet processor (62) is an FPGA and the downstream transceiver (63) is a USB transceiver. This arrangement may be used to build a remote extender for use in a wireless network FIG. 10 is a data flow diagram showing the operation of an extender unit (either local or remote) according to the invention. The operation of said extender unit is described by considering separately each of the major data flow paths that are required by the present invention. In operation however, said separate major data flow paths may be activated simultaneously and/or in any combination. There are four separate data flow paths that pertain to the operation of the present invention. The first and second paths are relevant, in the main, when individual USB data packets are travelling in a downstream direction, from the host computer, through a local extender and a remote extender to a USB peripheral device. The third and fourth paths are relevant, in the main, when individual USB data packets are travelling in an upstream direction, from a USB peripheral device, through a remote extender and a local extender to the host computer.

In a first data flow, USB data packets are forwarded from upstream transceiver (61) to downstream transceiver (63). To perform this operation, individual data bytes are reported by upstream transceiver (61) and forwarded to downstream FIFO (72) by downstream transaction handling process (71). In turn, downstream forwarding process (73) forwards said individual data bytes to downstream transceiver (63). As each byte is forwarded by said downstream transaction handling process (71), said process examines the content of each byte to extract information that is used to modify the contents of control registers (74).

In particular, according to the prior art USB specification, the first byte of each packet is a packet identifier (PID) that indicates the type of packet. PIDs include IN, OUT, ACK, NAK, DATA0/1 and SETUP values. The value of PID stored in said control registers (74) can be used to control subsequent handling of the entire data packet. In further particular, if the PID corresponds to a DATA0/1 value then the following bytes are examined to detect CBW_Signature, CBW_Tag, CBW_Data_Transfer_Length and CBW_Flags information.

In a particular instance of said first data flow, downstream transaction handling process (71) examines the PID and Address fields of said USB data packet. Said process (71) also examines the status of control registers (74). If said process (71) determines that the data packet should be absorbed, then the data bytes that comprise said USB data packet are not sent to downstream FIFO (72).

In a further instance of said first data flow, downstream transaction handling process (71) examines the PID and Address fields of said USB data packet. Said process (71) also examines the status of control registers (74). If said process (71) determines that a reply to said data packet is required, then process (71) requests upstream response handling process (81) to generate said reply.

In a second data flow, USB data packets received from upstream transceiver (61) are forwarded to microprocessor (76). To perform this operation, individual data bytes reported by upstream transceiver (61) are copied to request FIFO (75) by downstream transaction handling process (71). In turn said data bytes are read from request FIFO (75) by microprocessor (76).

In particular, when downstream transaction handling process (71) detects the presence of a SETUP PID, then the entire SETUP packet and the following DATA0/1 packet are both copied to said request FIFO. This action alerts microprocessor (76) to be prepared for a corresponding DATA0/1 packet containing USB descriptor information to be received on the upstream path.

In a third data flow, USB data packets are forwarded from downstream transceiver (63) to upstream transceiver (61). To perform this operation, individual data bytes are reported by downstream transceiver (63) and forwarded to upstream FIFO (78) by upstream transaction handling process (77). In turn, upstream caching process (79) removes data bytes from upstream FIFO (78) and stores said data bytes in upstream cache (80). At a later time and in response to a stimulus generated by downstream transaction handling (71) said data bytes are removed from upstream cache (80) by upstream response handling process (81) and forwarded to upstream transceiver (61).

In a particular instance of said second data flow, upstream transaction handling process (77) examines the PID field of said USB data packet. Said process (77) also examines the status of control registers (74). If said process (77) determines that the data packet should be absorbed, then the data bytes that comprise said USB data packet are not sent to upstream FIFO (78).

In a further instance of said first data flow, upstream transaction handling process (77) examines the PID field of said USB data packet. Said process (77) also examines the status of control registers (74). If said process (77) determines that a reply to said data packet is required, then process (77) requests downstream response handling process (73) to generate said reply.

In a fourth data flow, USB data packets received from downstream transceiver (63) are forwarded to microprocessor (76). To perform this operation, individual data bytes reported by downstream transceiver (63) are copied to status FIFO (82) by upstream transaction handling process (77). In turn said data bytes are read from status FIFO (82) by microprocessor (76).

In particular, when a SETUP(Get Descriptor) command is transmitted through downstream transceiver (63) and USB peripheral device (7) responds with the requested descriptor information embedded in a DATA0/1 packet, said requested descriptor information is captured by microprocessor (76). According to the prior art USB specification, parameters contained within said requested descriptor identify the interface class and interface protocol of said USB peripheral device (7). An algorithm within microprocessor (76) is used to isolate said interface class and interface protocol parameters. If it is determined that the interface class parameter of said USB peripheral device (7) is mass storage class (08 hexadecimal) and the interface protocol is bulk-only transport (50 hexadecimal) then microprocessor (76) sets control registers (74) to enable the application of the data transfer session handling described by the present invention.

Using this method and apparatus, it is thereby possible to detect automatically the presence of a USB mass storage device and thus, select the method(s) for handling data transfers between the host computer and the peripheral device, without manual intervention or configuration.

Thus, it is apparent that there has been provided, in accordance with the present invention, USB devices which fully, or at least partially, satisfy the means, objects, and advantages over the prior art as set forth hereinbefore. Therefore, having described specific embodiments of the present invention, it will be understood that alternatives, modifications and variations thereof may be suggested to those skilled in the art, and that it is intended that the present specification embrace all such alternatives, modifications and variations as fall within the scope of the appended claims.

Additionally, for clarity and unless otherwise stated, the word "comprise" and variations of the word such as "comprising" and "comprises", when used in the description and claims of the present specification, is not intended to exclude other additives, components, integers or steps.

I claim:

1. A method for transmitting an inbound data stream, over a transmission system in which the round-trip delay exceeds 1 microsecond, from a peripheral device to a host computer, wherein said host computer comprises a host controller, and said host controller and said peripheral device conform to the requirements of the USB Specification, and said peripheral device is a mass storage device, and said host computer and said peripheral device operate in accordance with the USB bulk only transport protocol, through a local extender and a remote extender, which method comprises:

A) a Command Phase comprising:
   a) forwarding an inbound data transfer command from said host computer to said USB peripheral device by sending said command to said local extender, having said local extender forward said command to said remote extender, and then having said remote extender forward said command to said USB peripheral device;
   b) forwarding an acknowledgement of said command from said USB peripheral device to said host computer by sending said acknowledgement to said remote extender, having said remote extender forward said acknowledgement to said local extender, and then having said local extender forward said acknowledgement to said host computer as a forwarded acknowledgement signal;
   c) having said local extender generate negative acknowledgement responses to said host computer until said forwarded acknowledgement signal has been received by said local extender;
   d) having said local extender absorb repetitions of said command generated by said host computer until said forwarded acknowledgement signal has been received by said local extender;

B) a Data Phase further comprising:
   e) forwarding a request for inbound data packets from said host computer to said USB peripheral device by sending said request to said local extender, having said local extender forward said request to said remote extender, and then having said remote extender forward said request to said USB peripheral device;
   f) forwarding inbound data packets from said USB peripheral device to said host computer by sending said inbound data packets to said remote extender, having said remote extender forward said inbound data packets to said local extender, and then having said local extender forward said inbound data packets to said host computer;
   g) having said remote extender generate acknowledgement responses to said USB peripheral device after each inbound data packet is received by said remote extender;
   h) having said local extender generate negative acknowledgement responses to said host computer until said inbound data packet has been received by said local extender;
   i) having said local extender absorb repetitions of said request for inbound data packets;
   j) having said local extender absorb acknowledgement packets received from said host computer;
   k) having said remote extender generate additional requests for inbound data packets to said USB peripheral device; and C) a Status Phase comprising:
   l) forwarding a request for inbound data transfer status from said host computer to said USB peripheral device by sending said request to said local extender, having said local extender forward said request to said remote extender, and then having said remote extender forward said request to said USB peripheral device;
   m) forwarding said inbound data transfer status from said USB peripheral device to said host computer by sending said status to said remote extender, having said remote extender forward said status to said local extender, and then having said local extender forward said status to said host computer;
   n) having said remote extender generate an acknowledgement response to said USB peripheral device;
   o) having said local extender generate negative acknowledgement responses to said host computer until said status has been received by said local extender; and
   p) having said local extender absorb repetitions of said request for inbound data transfer status until said status has been received by said local extender, and wherein during said command phase, said remote or local extender determines the requirements of said inbound data transfer command for said inbound data stream, and during step k) of said data phase, said remote extender repeats said additional requests until the requirements of said inbound data transfer command have been met.

2. A method as claimed in claim 1 wherein said mass storage device is a flash drive, a hard drive, or a CD/DVD drive.

3. A method as claimed in claim 1 wherein said mass storage device is either a high-speed (HS) or a full-speed (FS) device.

4. A method as claimed in claim 1 wherein said additional requests for inbound data packets are limited by having said local or remote extender determine the requirements of said inbound data stream by determining the boundaries and properties of said inbound data stream by:
   i) having said local or remote extender detect the start of a data transfer session by comparing the structure of each outbound data packet with that of a Command Block Wrapper (CBW) as defined by the USB Specification;
   ii) having said local or remote extender verify the detection of a CBW by comparing the first four bytes of said outbound data packet with the unique signature of a CBW;
   iii) having said local or remote extender extract a unique tag from said outbound data packet by reading data from the CBW Tag field as defined by the CBW structure;
   iv) having said local or remote extender determine the amount of data to be transmitted during said data transfer session by reading data from the CBW Data Transfer Length field as defined by the CBW structure;
   v) having said local or remote extender determine the direction of said data transfer session by reading data from the CBW Flags field as defined by the CBW structure.

5. A method as claimed in claim 4 wherein the completion of said inbound data transfer or said outbound data transfer is determined by detecting at said local extender or at said remote extender the generation of a command status wrapper by said USB mass storage device.

6. A method as claimed in claim 4 wherein the completion of said inbound data transfer or said outbound data transfer is determined by comparing at said local extender or at said remote extender the amount of data transmitted with said extracted value of data transfer length.

7. A method as claimed in claim 1 additionally comprising determination at a local extender or a remote extender the presence of a USB mass storage device operating according to the USB bulk only transport protocol by:
   a) detecting the generation of a SETUP packet by a host computer;
   b) determining that said SETUP command is a Get Descriptor command
   c) receiving from a USB peripheral device at least one DATA0/1 packet containing USB descriptor information;
   d) examining said USB descriptor to determine that the interface class parameter of said USB peripheral device is mass storage class;
   e) examining said USB descriptor to determine that the interface protocol is bulk-only transport protocol.

8. A method for transmitting an outbound data stream, over a transmission system in which the round-trip delay exceeds 1 microsecond, from a host computer to a peripheral device, wherein said host computer comprises a host controller, and said host controller and said peripheral device conform to the requirements of the USB Specification, and said peripheral device is a mass storage device, and said host computer and said peripheral device operate in accordance with the USB bulk only transport protocol, through a local extender and a remote extender, which method comprises:
   A) a Command Phase comprising:
      a) forwarding an outbound data transfer command from said host computer to said USB peripheral device by sending said command to said local extender, having said local extender forward said command to said remote extender, and then having said remote extender forward said command to said USB peripheral device;
      b) forwarding an acknowledgement of said command from said USB peripheral device to said host computer by sending said acknowledgement to said remote extender, having said remote extender forward said acknowledgement to said local extender, and then having said local extender forward said acknowledgement to said host computer as a forwarded acknowledgement signal;
      c) having said local extender generate negative acknowledgement responses to said host computer until said forwarded acknowledgement signal has been received by said local extender;
      d) having said local extender absorb repetitions of said command until said forwarded acknowledgement signal has been received by said local extender;
   B) a Data Phase further comprising:
      e) forwarding outbound data packets from said host computer to said USB peripheral device by sending said outbound data packets to said local extender, having said local extender forward said outbound data packets to said remote extender, and then having said remote extender forward said outbound data packets to said USB peripheral device;
      f) having said local extender generate positive acknowledgement responses to said host computer after each outbound data packet is received by said local extender;
      g) having said remote extender absorb each acknowledgement response generated by said USB peripheral device; and
   C) a Status Phase comprising:
      h) forwarding a request for outbound data command status from said host computer to said USB peripheral device by sending said request to said local extender, having said local extender forward said request to said remote extender, and then having said remote extender forward said request to said USB peripheral device;
      i) forwarding said outbound data command status from said USB peripheral device to said host computer by sending said status to said remote extender, having said remote extender forward said status to said local extender, and then having said local extender forward said status to said host computer;
      j) having said remote extender generate an acknowledgement response to said USB peripheral device;
      k) having said local extender generate negative acknowledgement responses to said host computer until said status has been received by said local extender; and
      l) having said local extender absorb repetitions of said request for outbound data command status until said status has been received by said local extender, and wherein during said command phase, said local extender determines the requirements of said outbound data transfer command for said outbound data stream, and during steps f) and g) of said data phase, said local extender generates said positive acknowledgement responses, and said remote extender absorbs said acknowledgement response, until the requirements of said outbound data transfer command have been met.

9. A method as claimed in claim 8 wherein said mass storage device is a flash drive, a hard drive, or a CD/DVD drive.

10. A method as claimed in claim 8 wherein said mass storage device is either a high-speed (HS) or a full-speed (FS) device.

11. A method as claimed in claim 8 wherein said local or remote extender determines the requirements of said outbound data stream by determining the boundaries and properties of said inbound data stream by:
   i) having said local or remote extender detect the start of a data transfer session by comparing the structure of each outbound data packet with that of a Command Block Wrapper (CBW) as defined by the USB Specification;
   ii) having said local or remote extender verify the detection of a CBW by comparing the first four bytes of said outbound data packet with the unique signature of a CBW;
   iii) having said local or remote extender extract a unique tag from said outbound data packet by reading data from the CBW Tag field as defined by the CBW structure;
   iv) having said local or remote extender determine the amount of data to be transmitted during said data transfer session by reading data from the CBW Data Transfer Length field as defined by the CBW structure;
   v) having said local or remote extender determine the direction of said data transfer session by reading data from the CBW Flags field as defined by the CBW structure.

12. A method as claimed in claim 11 wherein the completion of said outbound data transfer or said outbound data transfer is determined by comparing at said local extender or at said remote extender the amount of data transmitted with said extracted value of data transfer length.

13. A method as claimed in claim 11 wherein the completion of said outbound data transfer or said outbound data transfer is determined by comparing at said local extender or at said remote extender the amount of data transmitted with said extracted value of data transfer length.

14. A method as claimed in claim 8 additionally comprising determination at a local extender or a remote extender the presence of a USB mass storage device operating according to the USB bulk only transport protocol by:
   a) detecting the generation of a SETUP packet by a host computer;
   b) determining that said SETUP command is a Get Descriptor command
   c) receiving from a USB peripheral device at least one DATA0/1 packet containing USB descriptor information;
   d) examining said USB descriptor to determine that the interface class parameter of said USB peripheral device is mass storage class;
   e) examining said USB descriptor to determine that the interface protocol is bulk-only transport protocol.

15. An apparatus for transmitting data between a host computer having a host controller, and a USB peripheral device in the presence of transmission delays greater than that normally allowed in the USB specification, and wherein said host controller and said peripheral device conform to the requirements of the USB Specification, said peripheral device is a mass storage device, and said host computer and said peripheral device operate in accordance with the USB bulk only transport protocol, said apparatus comprising:
   a) a host computer for initiating an inbound or outbound data-transfer session, said session comprising: i) a command phase; ii) a data phase; and iii) a status phase;
   b) a local extender unit for forwarding command and outbound data packets from said host computer to said remote extender, and for forwarding inbound data, status and acknowledgement packets from said remote extender to said host computer;
   c) a data transmission system exhibiting transmission delays greater than 1 microsecond;
   d) a remote extender unit for forwarding command and outbound data packets from said local extender to said USB peripheral device, and for forwarding inbound data, status and acknowledgement packets from said USB peripheral device to said local extender;
   e) a USB peripheral device capable of responding to data transfer commands;
   f) means in said local extender unit for generating a data-transfer acknowledgement packet and sending said packet to said host computer;
   g) means in said local extender unit for storing an inbound data packet or inbound acknowledgement packet until such packet is requested by said host computer;
   h) means in said local extender unit for absorbing replicated command, outbound data and status request packets;
   i) means in said remote extender unit for generating a data-transfer acknowledgement packet and sending said packet to said USB peripheral device;
   j) means in said remote extender unit for generating a request for inbound data-transfer and sending said request to said USB peripheral device; and
   k) means in said remote extender unit for absorbing data-transfer acknowledgement packets; and wherein said apparatus comprises means in said local or remote extender, or both said local and remote extender units for recognizing when an inbound or outbound data transfer session is initiated and when said data transmission session is complete.

16. An apparatus as claimed in claim 15 wherein said mass storage device is a flash drive, a hard drive, or a CD/DVD drive.

* * * * *